(12) United States Patent
Fujii et al.

(10) Patent No.: US 9,217,359 B2
(45) Date of Patent: Dec. 22, 2015

(54) INTERNAL-COMBUSTION ENGINE

(71) Applicant: HONDA MOTOR CO., LTD., Tokyo (JP)

(72) Inventors: Kinya Fujii, Wako (JP); Teruo Kobayashi, Wako (JP); Yuki Ito, Wako (JP); Shuichi Kitahara, Wako (JP); Nobuo Suzuki, Wako (JP); Yuusuke Wada, Wako (JP); Kaoru Ishii, Wako (JP); Kan Nakaune, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 483 days.

(21) Appl. No.: 13/680,111

(22) Filed: Nov. 19, 2012

(65) Prior Publication Data
US 2013/0133614 A1    May 30, 2013

(30) Foreign Application Priority Data

Nov. 25, 2011   (JP) .................................. 2011-257257

(51) Int. Cl.
| | |
|---|---|
| *F02F 3/26* | (2006.01) |
| *F02B 15/00* | (2006.01) |
| *F02B 17/00* | (2006.01) |
| *F02B 23/10* | (2006.01) |

(52) U.S. Cl.
CPC ............... *F02B 15/00* (2013.01); *F02B 17/005* (2013.01); *F02B 23/105* (2013.01); *F02B 23/104* (2013.01); *Y02T 10/125* (2013.01)

(58) Field of Classification Search
CPC ................ Y02T 10/125; Y02T 10/123; F02B 2075/125; F02B 23/104; F02B 23/105; F02F 3/26
USPC ................................................ 123/298, 307
See application file for complete search history.

(56) References Cited

U.S. PATENT DOCUMENTS

| | | | | |
|---|---|---|---|---|
| 5,943,993 A | * | 8/1999 | Carstensen et al. | ........... 123/298 |
| 6,129,070 A | * | 10/2000 | Jingu et al. | .................... 123/298 |

(Continued)

FOREIGN PATENT DOCUMENTS

| | | |
|---|---|---|
| JP | 11-036870 | 2/1999 |
| JP | 2004-019456 | 1/2004 |

(Continued)

OTHER PUBLICATIONS

Japanese Office Action for corresponding JP Application No. 2011-257257, Sep. 30, 2013.

*Primary Examiner* — Hai Huynh
*Assistant Examiner* — Gonzalo Laguarda
(74) *Attorney, Agent, or Firm* — Mori & Ward, LLP (57) ABSTRACT

An internal-combustion engine includes a cylinder, a piston, a spark plug, and a fuel injection device. The piston includes a top surface, a guiding protrusion, and a cavity. The cavity is provided at a position closer to the fuel injection device than the guiding protrusion when viewed from above the top surface of the piston. The guiding protrusion includes a guiding surface to guide the fuel mist toward the spark plug when the fuel mist is injected from the fuel injection device at a first predetermined timing in a compression stroke. The cavity includes a guiding wall portion to guide the fuel mist toward the spark plug when the fuel mist is injected from the fuel injection device at a timing in the compression stroke between the first predetermined timing and a second predetermined timing.

9 Claims, 9 Drawing Sheets

(56) References Cited

U.S. PATENT DOCUMENTS

| | | | |
|---|---|---|---|
| 6,223,715 B1 * | 5/2001 | Suzuki | 123/294 |
| 2006/0102141 A1 * | 5/2006 | Nakayama et al. | 123/298 |
| 2009/0235897 A1 * | 9/2009 | Fujikawa et al. | 123/305 |

FOREIGN PATENT DOCUMENTS

| | | |
|---|---|---|
| JP | 2007-092633 | 4/2007 |
| JP | 2008-151020 | 7/2008 |

* cited by examiner

INTERNAL-COMBUSTION ENGINE

CROSS-REFERENCE TO RELATED APPLICATIONS

The present application claims priority under 35 U.S.C. §119 to Japanese Patent Application No. 2011-257257, filed Nov. 25, 2011, entitled "Internal-Combustion Engine." The contents of this application are incorporated herein by reference in their entirety.

BACKGROUND OF THE INVENTION

1. Field of the Invention

The present application relates to an internal-combustion engine.

2. Discussion of the Background

An in-cylinder direct-injection internal-combustion engine as an exemplary related art is disclosed by Japanese Patent No. 4054223. This internal-combustion engine includes a spark plug that faces the inside of a cylinder from above, a piston that reciprocates in the cylinder, a fuel injection valve that injects fuel into the cylinder from obliquely above, and so forth.

The piston has a cavity in the top surface thereof. The cavity extends from a position near the center of the piston to a position near an injection port of the fuel injection valve. The cavity has an elliptical plan-view shape whose longitudinal direction corresponds to a direction orthogonal to the axial direction of the fuel injection valve. The cavity has a flat elliptical bottom surface and guiding walls surrounding the bottom surface. The guiding walls extend linearly and obliquely upward from the bottom surface toward the outer side.

The fuel injection valve is configured to inject fuel mists from the injection port thereof. The fuel mists include a main fuel mist and a sub-fuel mist that are injected at respectively different predetermined angles. The fuel mists each have a flat shape in side view and a fan shape in plan view. The main fuel mist is injected at a nearly vertical angle and toward one of the guiding walls that is nearer to the fuel injection valve. The sub-fuel mist is injected at a nearly horizontal angle and toward the other guiding wall that is farther from the fuel injection valve.

When, for example, the internal-combustion engine is under a low load and at a low rotational speed, a stratified combustion mode is performed. In the stratified combustion mode, the fuel is injected from the fuel injection valve in the latter stage of the compression stroke. As illustrated in FIG. 6 of Japanese Patent No. 4054223, most of the main fuel mist injected as described above collides with the bottom surface of the cavity and is guided upward along the guiding wall that is nearer to the fuel injection valve, whereas most of the sub-fuel mist collides with the guiding wall that is farther from the fuel injection valve and is guided upward along the same guiding wall. Thus, a high-concentration air-fuel mixture gathers around the spark plug in a combustion chamber of the engine while a low-concentration air-fuel mixture surrounds the high-concentration air-fuel mixture, producing layers of air-fuel mixture, i.e., a stratified air-fuel mixture.

SUMMARY OF THE INVENTION

According to one aspect of the present invention, an internal-combustion engine includes a cylinder, a piston, a spark plug, and a fuel injection device. The piston is provided in the cylinder to reciprocate in the cylinder and includes a top surface, a guiding protrusion, and a cavity. The guiding protrusion projects from a predetermined position of the top surface. The cavity is provided in the top surface. The spark plug is provided to face toward an inside of the cylinder and to generate a spark that ignites a mixture of fuel and air in the cylinder. The spark plug faces toward an inside of the cylinder. The fuel injection device is to obliquely inject the fuel in a form of a fuel mist toward the top surface of the piston. The cavity is provided at a position closer to the fuel injection device than the guiding protrusion when viewed from above the top surface of the piston. The guiding protrusion includes a guiding surface to guide the fuel mist toward the spark plug when the fuel mist is injected from the fuel injection device at a first predetermined timing in a compression stroke. The piston is provided to reach a first predetermined position at the first predetermined timing. The cavity includes a guiding wall portion to guide the fuel mist toward the spark plug when the fuel mist is injected from the fuel injection device at a timing in the compression stroke between the first predetermined timing and a second predetermined timing. The piston is provided to reach a second predetermined position closer to a top dead center than the first predetermined position at the second predetermined timing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

An internal-combustion engine (hereinafter referred to as "engine") 1 according to the embodiment is a V-six gasoline engine provided as a power source in a vehicle (not illustrated). The engine 1 includes two banks arranged in a V shape and each including a row of three cylinders. The engine 1 is configured to switch its operation mode between a homogeneous combustion mode in which a homogeneous air-fuel mixture is burned and a stratified combustion mode in which a stratified air-fuel mixture is burned.

Figure 1:
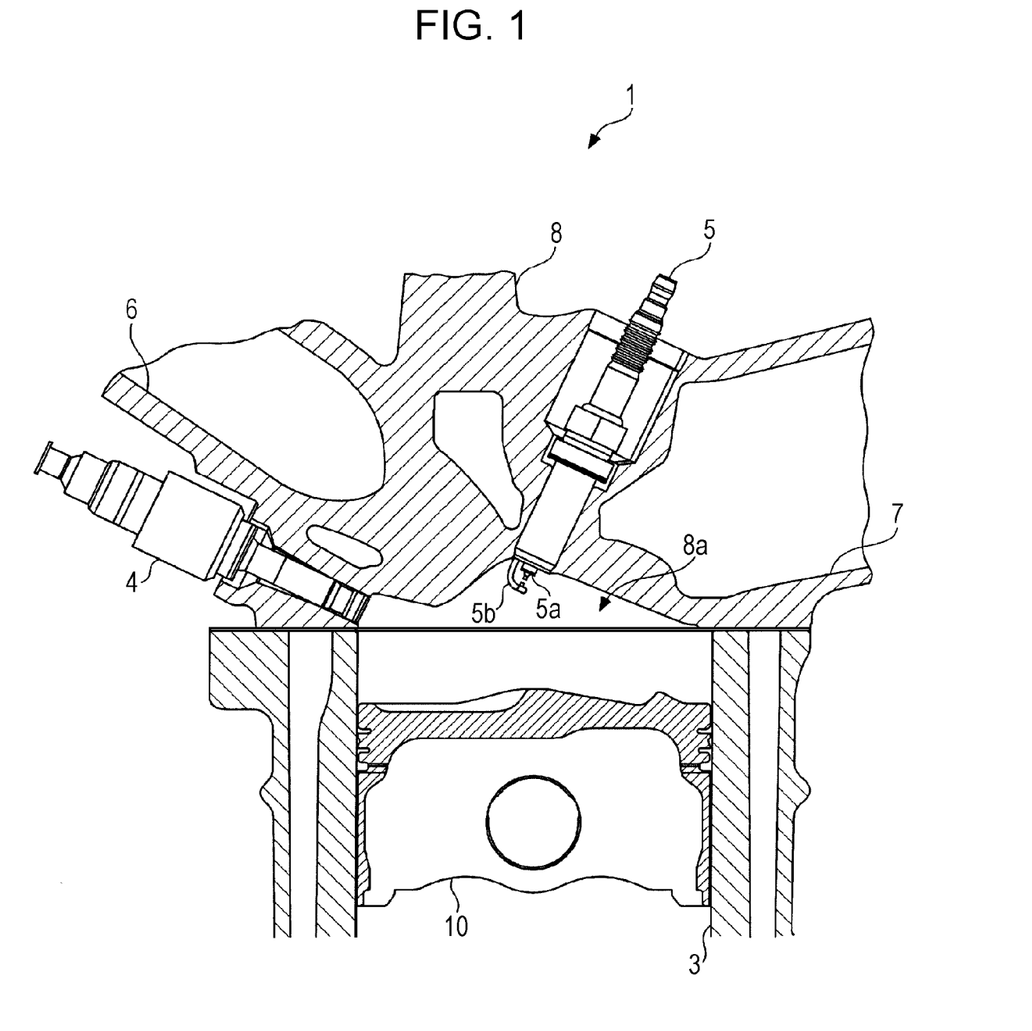
FIG. 1 is a sectional view of members included in an internal-combustion engine according to an embodiment of the present application including a cylinder and a cylinder head.

Referring to FIG. 1, the engine 1 includes six pairs of cylinders 3 and pistons 10 (only one pair of a cylinder 3 and a piston 10 are illustrated). Each of the cylinders 3 is provided with a fuel injection valve 4, a spark plug 5, and so forth. FIG. 1 is a sectional view of the engine 1 in which the axial direction of the cylinder 3 corresponds to the vertical direction. As a matter of convenience, the near side, the far side, the upper side, and the lower side in FIG. 1 are hereinafter defined as the front side, the rear side, the upper side, and the lower side, respectively. In addition, the following description is given focusing on one pair of the cylinder 3 and the piston 10. The engine 1 includes a cylinder head 8 having an intake port 6 and an exhaust port 7. Air is taken into the cylinder 3 via the intake port 6 in the intake stroke. Burned gas is exhausted from the cylinder 3 via the exhaust port 7 in the exhaust stroke.

The fuel injection valve 4 is provided below the intake port 6 and is obliquely fixed to the cylinder head 8 with the tip thereof on the injection side facing toward the inside of a combustion chamber 8a. The fuel injection valve 4 is positioned such that the center axis thereof passes through the center of the piston 10 in plan view (see FIGS. 9A and 11A). The fuel injection valve 4 is connected to a fuel supply device (not illustrated). Fuel in a pressurized state is supplied to the fuel injection valve 4 from the fuel supply device.

The fuel injection valve 4 is also electrically connected to a control device (not illustrated). When a control input signal is supplied to the fuel injection valve 4 from the control device, the fuel injection valve 4 is opened at a timing and for a period of time corresponding to the control input signal, whereby the fuel is injected into the cylinder 3. The timing of opening the fuel injection valve 4, i.e., the timing of starting injection, in a case where the engine 1 is in the stratified combustion mode is set to a point of time in the compression stroke, specifically, a point of time between a first predetermined timing at which the piston 10 reaches a first predetermined position (for example, a position at a crank angle of several tens of degrees before the top dead center (BTDC), see FIGS. 1, 8B, and 9B) and a second predetermined timing at which the piston 10 reaches a second predetermined position that is nearer to the top dead center (TDC) by a crank angle of ten-odd degrees than the first predetermined position (see FIGS. 10B and 11B).

Figure 2:
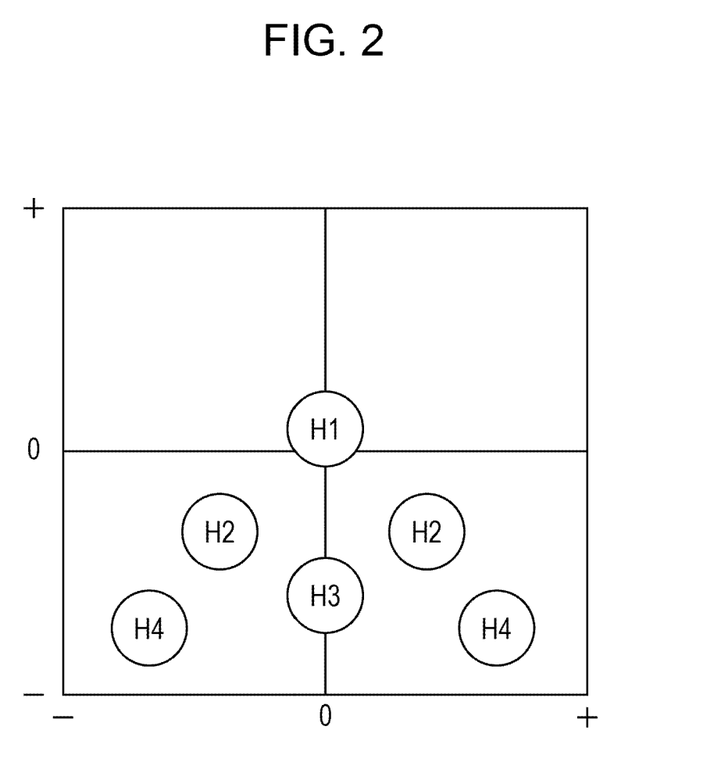
FIG. 2 illustrates the angles of injections from six injection ports of a fuel injection valve.

Referring to FIG. 2, the fuel injection valve 4 has a first injection port H1, a pair of second injection ports H2, a third injection port H3, and a pair of fourth injection ports H4. FIG. 2 illustrates the angles of fuel injections (the angles of the center axes of fuel mists) from the six injection ports H represented in a plane orthogonal to the center axis of the fuel injection valve 4 in the form of an orthogonal coordinate system in which the point through which the center axis of the fuel injection valve 4 passes is defined as the origin (zero degrees). The centers of the circles representing the injection ports H correspond to the coordinates representing the angles of injections, respectively.

As illustrated in FIG. 2, letting $\theta 1$ be a positive predetermined angle, the injection from the first injection port H1 is angled in the y-axis direction by a predetermined angle of $\theta 1$ with respect to the center axis of the fuel injection valve 4. That is, the injection from the first injection port H1 is angled slightly upward with respect to the center axis of the fuel injection valve 4. Letting $\theta 2$ and $\theta 2'$ be predetermined values, respectively, satisfying $\theta 2 > \theta 1$ and $\theta 2' > 0$, the injections from the pair of second injection ports H2 are angled in the y-axis direction by a predetermined angle of $-\theta 2$ with respect to the center axis of the fuel injection valve 4 and in the x-axis direction by predetermined angles of $\pm\theta 2'$, respectively, with respect to the center axis of the fuel injection valve 4. That is, the injections from the pair of second injection ports H2 are angled downward and toward the front and rear sides, respectively, with respect to the center axis of the fuel injection valve 4.

Furthermore, letting $\theta 3$ be a predetermined value satisfying $\theta 3 > \theta 2$, the injection from the third injection port H3 is angled in the y-axis direction by a predetermined angle of $-\theta 3$ with respect to the center axis of the fuel injection valve 4. That is, the injection from the third injection port H3 is angled more downward than the injections from the second injection ports H2. Furthermore, letting $\theta 4$ and $\theta 4'$ be predetermined values, respectively, satisfying $\theta 4 > \theta 3$ and $\theta 4' > \theta 2'$, the injections from the pair of fourth injection ports H4 are angled in the y-axis direction by a predetermined angle of $-\theta 4$ with respect to the center axis of the fuel injection valve 4 and in the x-axis direction by predetermined angles of $\pm\theta 4'$, respectively, with respect to the center axis of the fuel injection valve 4. That is, the injections from the pair of fourth injection ports H4 are angled more downward than the injection from the third injection port H3 and more toward the front and rear sides, respectively, than the injections from the second injection ports H2 with respect to the center axis of the fuel injection valve 4.

The angles of injections from the first to fourth injection ports H1 to H4 of the fuel injection valve 4 are set as described above. Hence, fuel mists injected from the first to fourth injection ports H1 to H4 flow in respective directions away from the center axis of the fuel injection valve 4 and away from one another (see FIGS. 8A, 8B, 10A, and 10B).

The spark plug 5 is obliquely fixed to the cylinder head 8. The angle of the spark plug 5 is substantially equal to the angle of a sloping wall portion 11d of a cavity 11, which is provided in the piston 10, for the below-described reason. The spark plug 5 includes a center electrode 5a and a ground electrode 5b. The electrodes 5a and 5b face the inside of the combustion chamber 8a and are positioned near the center of the cylinder 3 in plan view. The spark plug 5 is electrically connected to an ignition coil (not illustrated). When a high voltage is applied from the ignition coil to the spark plug 5, the spark plug 5 generates a spark by causing discharge between the electrodes 5a and 5b, thereby burning the air-fuel mixture produced in the combustion chamber 8a.

Figure 3:
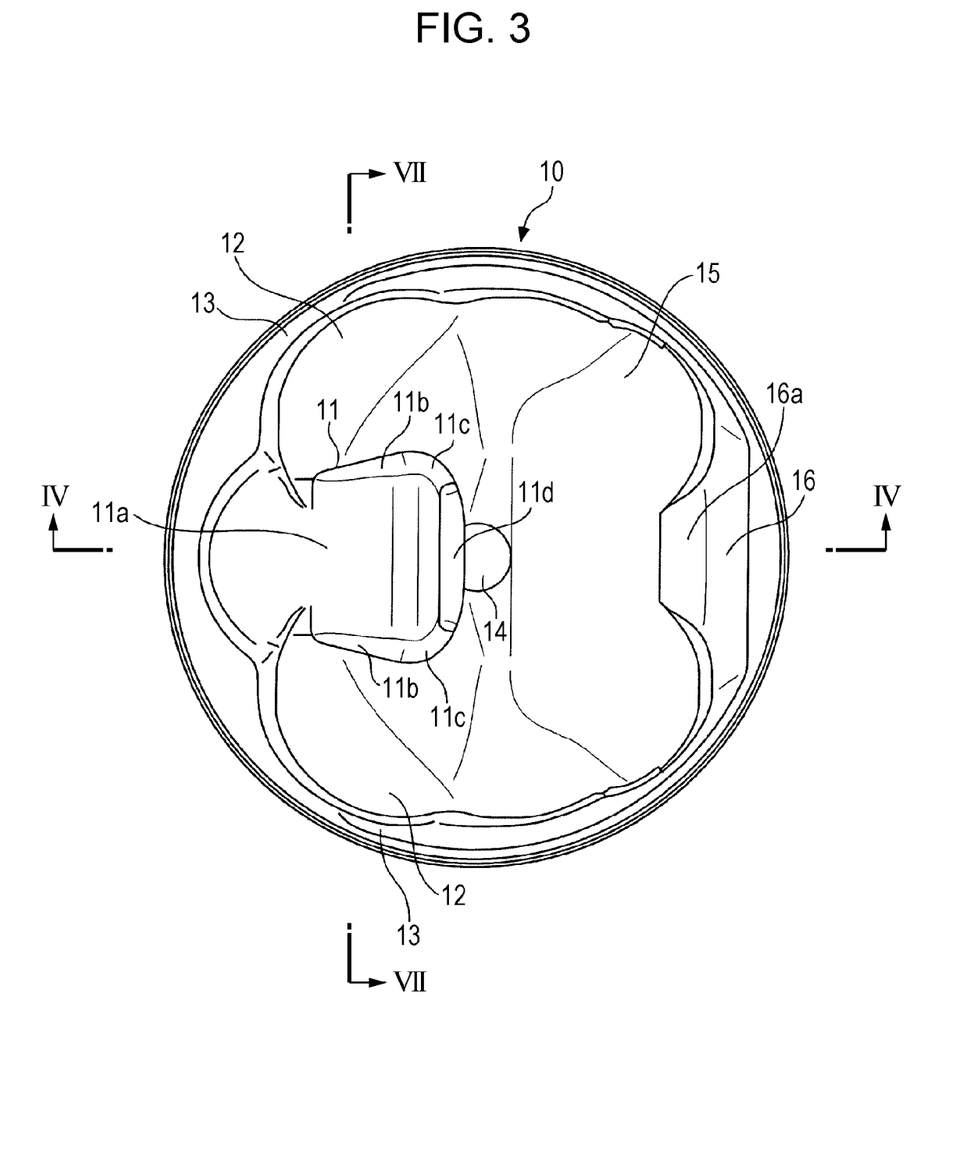
FIG. 3 is a plan view of a piston.
Figure 4:
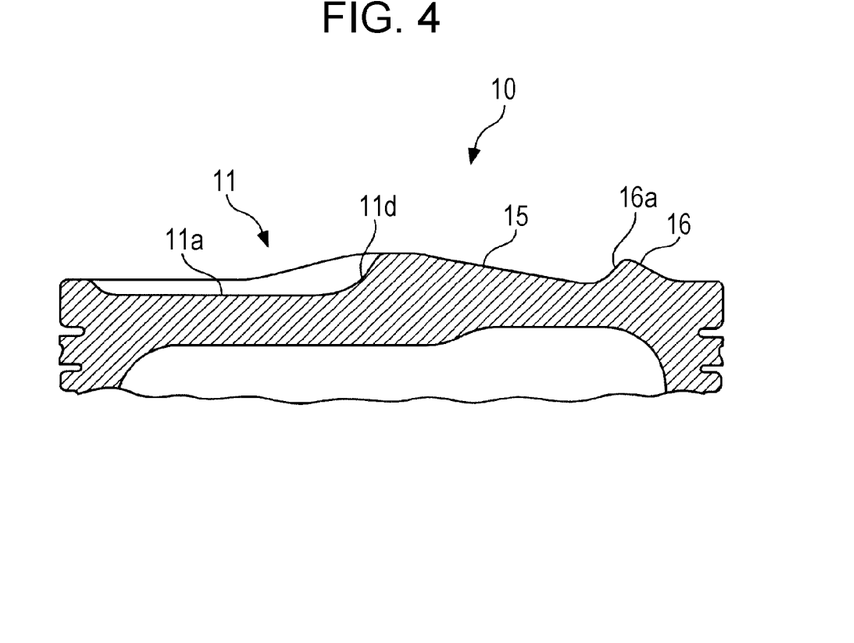
FIG. 4 is a sectional view taken along line IV-IV illustrated in FIG. 3.
Figure 5:
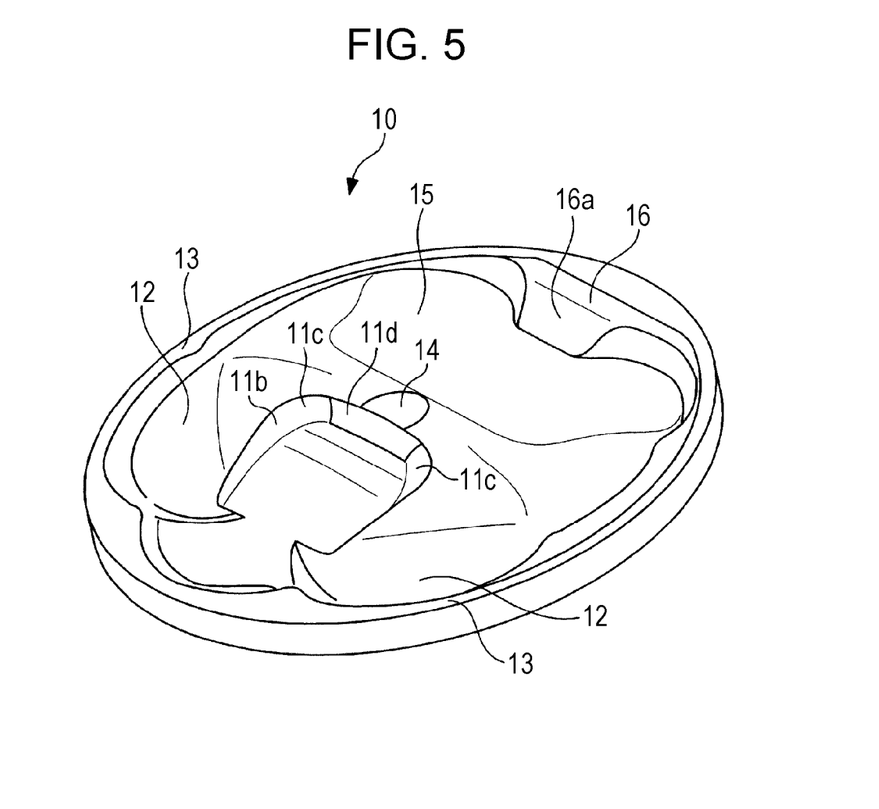
FIG. 5 is a perspective view of the top end of the piston.
Figure 9A:
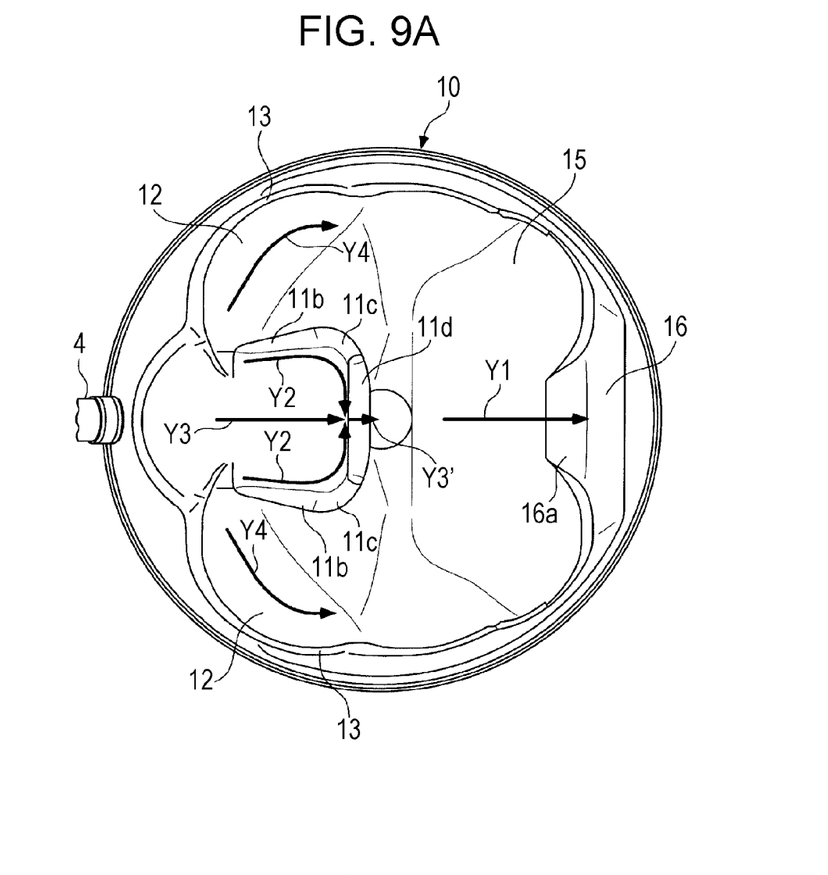
FIGS. 9A and 9B are a plan view and a sectional view, respectively, of the top end of the piston illustrating flows of the fuel mists in the case where the fuel is injected at the first predetermined timing.

Referring now to FIGS. 3 to 7, the piston 10 will be described. The piston 10 is mechanically connected to a crank shaft (not illustrated). When the crank shaft rotates, the piston 10 reciprocates in the cylinder 3 between the top dead center (TDC) and the bottom dead center (BDC). As illustrated in FIGS. 3, 9A, and others, the top surface of the piston 10 is configured line symmetrically in plan view with respect to the center axis of the fuel injection valve 4 and has the cavity 11 provided in a portion thereof nearer to the intake side.

The cavity 11 has a flat bottom surface 11a and a guiding wall surrounding the bottom surface 11a. The guiding wall includes a pair of sidewall portions 11b, a pair of curved wall portions 11c, and the sloping wall portion 11d. The pair of sidewall portions 11b are continuous with the front and rear ends, respectively, of the bottom surface 11a. The pair of sidewall portions 11b slope such that the distance therebetween increases toward the upper side and each have such a shape that the width thereof increases from the intake side toward the exhaust side. The pair of sidewall portions 11b extend in directions that are substantially parallel to the axes of the injections from the pair of second injection ports H2 in plan view (see FIGS. 8A and 10A).

Figure 6:
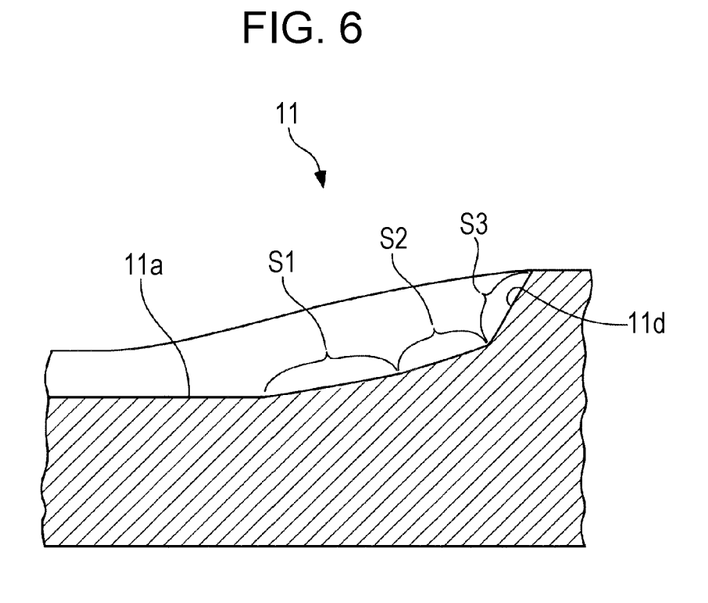
FIG. 6 is an enlarged view of a cavity, illustrated in FIG. 4, including a sloping wall portion.
Figure 7:
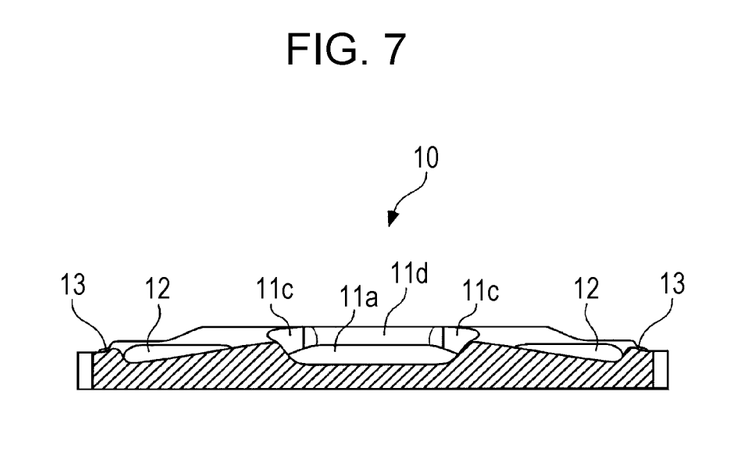
FIG. 7 is a sectional view taken along line VII-VII illustrated in FIG. 3.

The pair of curved wall portions 11c each curve from the exhaust-side end of a corresponding one of the pair of sidewall portions 11b toward the center of the piston 10. The sloping wall portion 11d is continuous with the pair of curved wall portions 11c. As illustrated in FIG. 6, the sloping wall portion 11d and the bottom surface 11a in combination form three sloping surfaces S1 to S3 that are continuous with one another. The sloping surfaces S1 to S3 are at respective angles that increase stepwise from the intake side toward the exhaust side for the below-described reason.

A pair of guiding slopes 12 are provided on the outer sides of the pair of sidewall portions 11b, respectively, of the cavity 11. The guiding slopes 12 each slope upward toward the center of the piston 10. Peripheral walls 13 are provided on the outer sides of the guiding slopes 12, respectively. The peripheral walls 13 are continuous with the respective guiding slopes 12 and extend along the outer circumference of the piston 10.

Furthermore, the top surface of the piston 10 includes a flat surface 14 in a central portion thereof. The flat surface 14 has a circular plan-view shape with part thereof being cut away and is continuous with the sloping wall portion 11d. The top surface of the piston 10 further includes a sloping surface 15 and a guiding protrusion 16 in respective portions thereof on the exhaust side. The sloping surface 15 slopes downward toward the exhaust side. The guiding protrusion 16 is continuous with the exhaust-side end of the sloping surface 15. The guiding protrusion 16 extends along the outer circumference of the piston 10 and has a sloping surface 16a (a guiding surface) provided in a central portion thereof and sloping upward. The centers of the sloping wall portion 11d and the sloping surface 16a reside on an extension of the center axis of the fuel injection valve 4 in plan view.

Referring now to FIGS. 8A to 11B, an operation of the engine 1 configured as described above will be described in which a stratified air-fuel mixture is produced in the stratified combustion mode. Hereinafter, the fuel mists injected from the first injection port H1, the second injection ports H2, the third injection port H3, and the fourth injection ports H4 are referred to as "first fuel mist F1", "second fuel mists F2", "third fuel mist F3", and "fourth fuel mists F4", respectively.

Figure 8A:
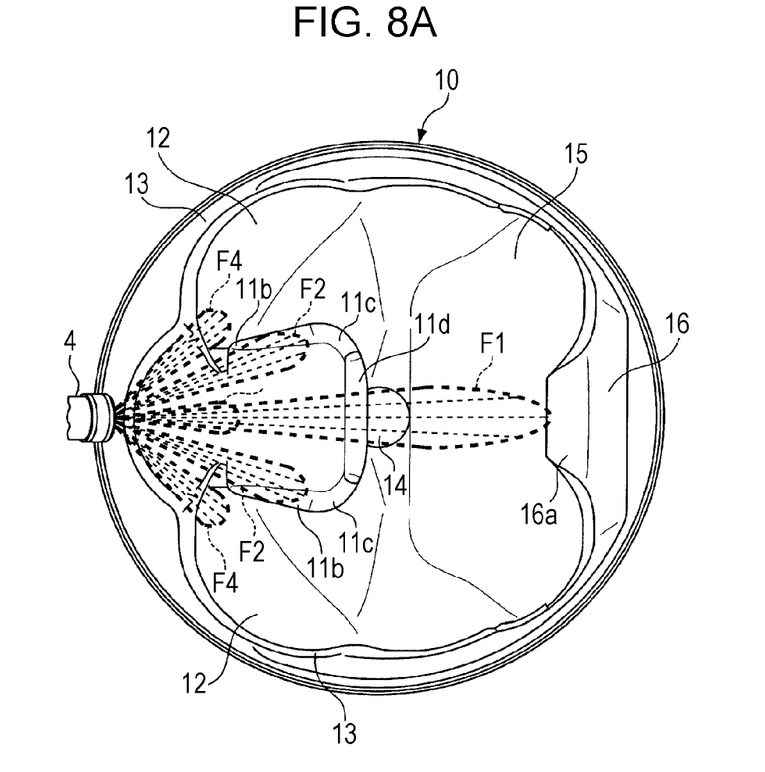
FIGS. 8A and 8B are a plan view and a sectional view, respectively, of the top end of the piston illustrating states of fuel mists in a case where fuel is injected at a first predetermined timing.
Figure 8B:
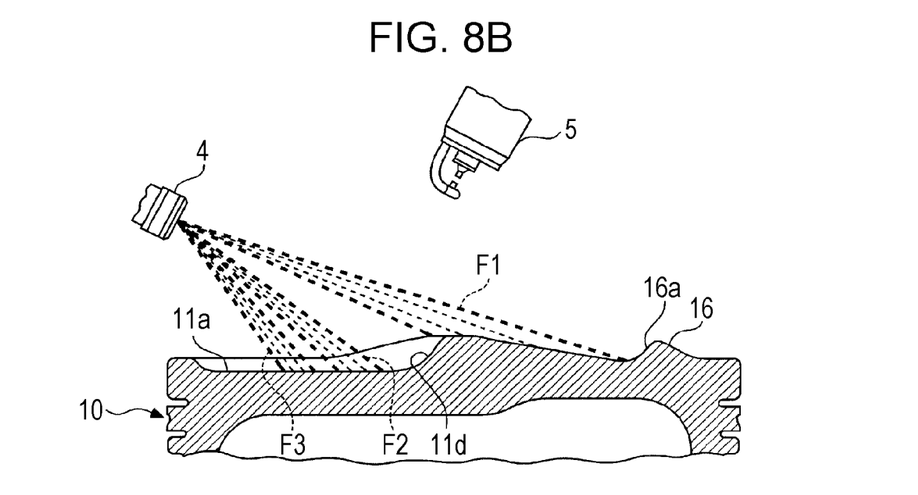
Figure 9B:
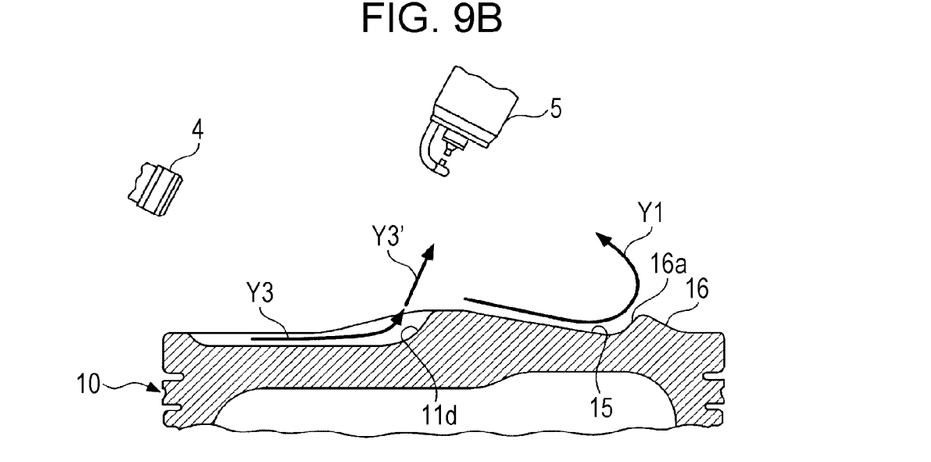

In a case where the fuel is injected from the fuel injection valve 4 in the compression stroke at the first predetermined timing at which the piston 10 reaches the first predetermined position described above, the first to fourth fuel mists F1 to F4 reach (collide with) the top surface of the piston 10 as illustrated in FIGS. 8A and 8B and then flow as illustrated in FIGS. 9A and 9B. In FIG. 8B, the fourth fuel mists F4 are not illustrated for easy understanding.

Specifically, the first fuel mist F1 reaches the flat surface 14 and the sloping surface 15, flows along the sloping surface 15, and is guided upward by the sloping surface 16a of the guiding protrusion 16 as represented by arrow Y1 in FIGS. 9A and 9B. Subsequently, the first fuel mist F1 flows along the inner wall of the combustion chamber 8a toward the spark plug 5.

The second fuel mists F2 reach the respective sidewall portions 11b and flow along the sidewall portions 11b as represented by arrows Y2 in FIG. 9A. Since the sidewall portions 11b extend substantially parallel to the axes of the injections from the second injection ports H2 in plan view as described above, the second fuel mists F2 flow along the sidewall portions 11b substantially without going over the sidewall portions 11b and being diffused. Subsequently, the second fuel mists F2 are gathered toward the center of the piston 10 by the respective curved wall portions 11c that curve from the sidewall portions 11b toward the center of the piston 10. Then, the second fuel mists F2 collide with and are combined with each other near the center of the sloping wall portion 11d as represented by arrows Y2. In this process, the second fuel mists F2 are gathered toward the center of the piston 10 while being decelerated by the curved wall portions 11c. Therefore, the second fuel mists F2 are gathered toward the center of the piston 10 substantially without going over the curved wall portions 11c and being diffused. Thus, the second fuel mists F2 are efficiently gathered and combined near the center of the sloping wall portion 11d.

The third fuel mist F3 reaches the bottom surface 11a of the cavity 11 and flows along the bottom surface 11a toward the sloping wall portion 11d as represented by arrow Y3 in FIGS. 9A and 9B. As described above, the bottom surface 11a and the sloping wall portion 11d in combination form the three sloping surfaces S1 to S3 that are continuous with one another, and the three sloping surfaces S1 to S3 are at respective angles that increase stepwise from the intake side toward the exhaust side. Therefore, the penetration of the third fuel mist F3 is attenuated stepwise. Consequently, the generation of liquid droplets and hence the generation of deposits on the sloping surfaces S1 to S3 from the third fuel mist F3 are suppressed.

Subsequently, the third fuel mist F3 collides with and is combined with the pair of second fuel mists F2 that have been combined together near the center of the sloping wall portion 11d. In this process, the third fuel mist F3 penetrates in such a manner as to push up the second fuel mists F2. Accordingly, the combination of the second fuel mists F2 and the third fuel mist F3 flows along the sloping wall portion 11d toward the spark plug 5 and reaches a position near the electrodes 5a and 5b of the spark plug 5 as represented by arrow Y3' in FIGS. 9A and 9B. In this process, as described above, the angle of the sloping wall portion 11d is substantially equal to the angle of the spark plug 5. Therefore, the second fuel mists F2 and the third fuel mist F3 are efficiently sent to a position near the electrodes 5a and 5b.

In FIG. 9B, for easy understanding, arrow Y3 representing the flow of the third fuel mist F3 is illustrated nearer to the bottom surface 11a than the actual center of the flow of the third fuel mist F3, and arrow Y3' representing the flow of the combination of the second and third fuel mists F2 and F3 is also illustrated nearer to the sloping wall portion 11d than the actual center of the flow of the combination of the second and third fuel mists F2 and F3.

The fourth fuel mists F4 reach the respective guiding slopes 12 provided on the outer sides of the cavity 11 and are guided upward along the guiding slopes 12 and the peripheral walls 13 as represented by arrows Y4 in FIG. 9A. Therefore, an air-fuel mixture having an air-fuel ratio suitable for stratified combustion is produced by the fourth fuel mists F4 around a high-concentration air-fuel mixture produced by the combination of the first to third fuel mists F1 to F3 gathered around the electrodes 5a and 5b of the spark plug 5. Thus, a stratified air-fuel mixture is produced in which a high-concentration air-fuel mixture gathered around the electrodes 5a and 5b of the spark plug 5 is surrounded by a relatively low-concentration air-fuel mixture. That is, a stratified air-fuel mixture is produced in the best state for causing stratified combustion.

Figure 10A:
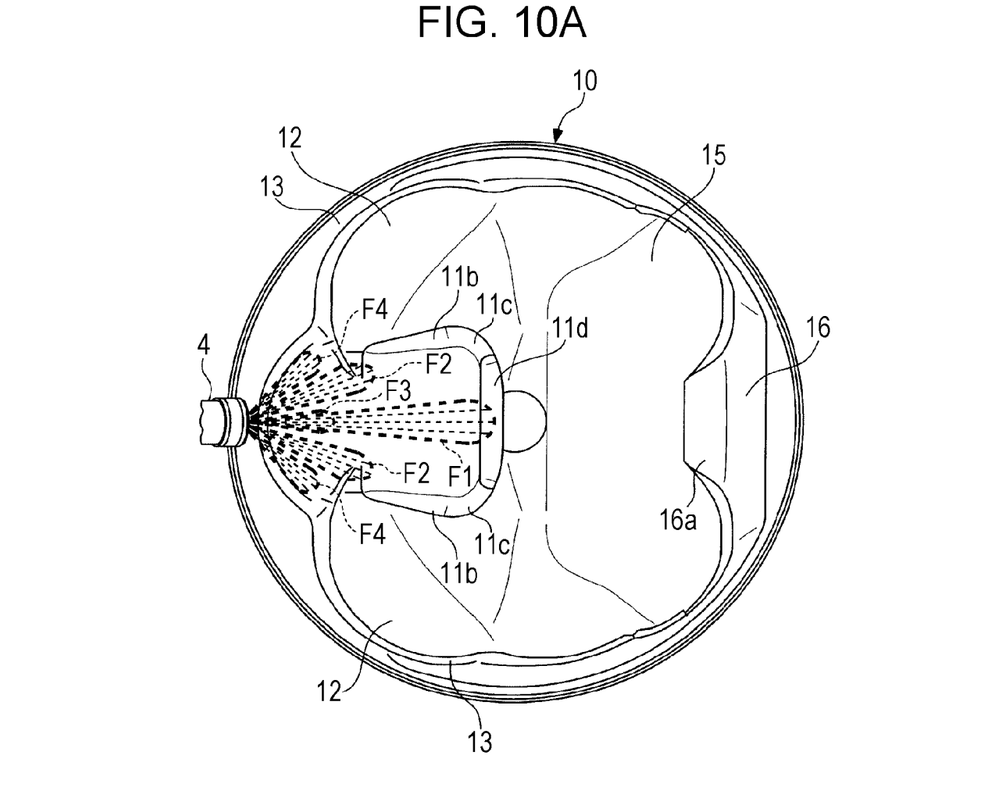
FIGS. 10A and 10B are a plan view and a sectional view, respectively, of the top end of the piston illustrating states of the fuel mists in a case where the fuel is injected at a second predetermined timing.
Figure 10B:
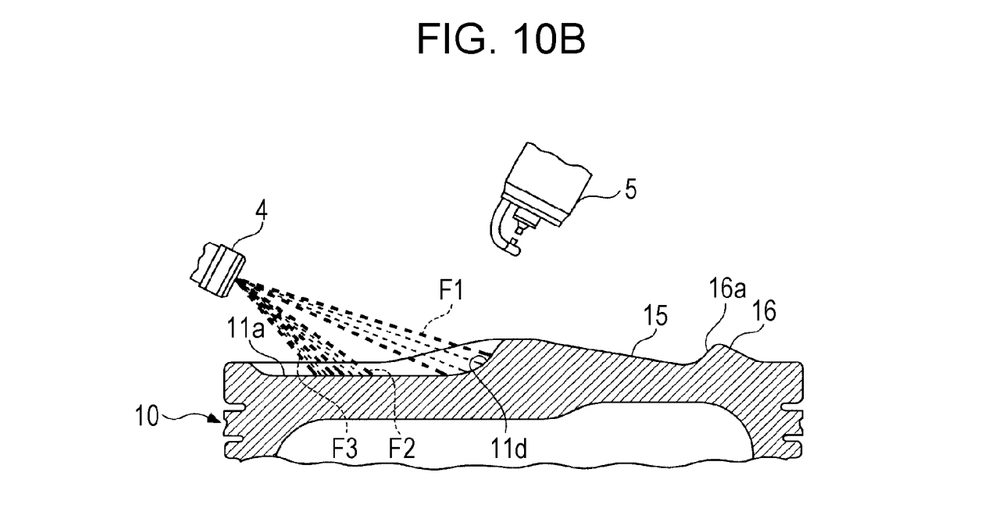
Figure 11A:
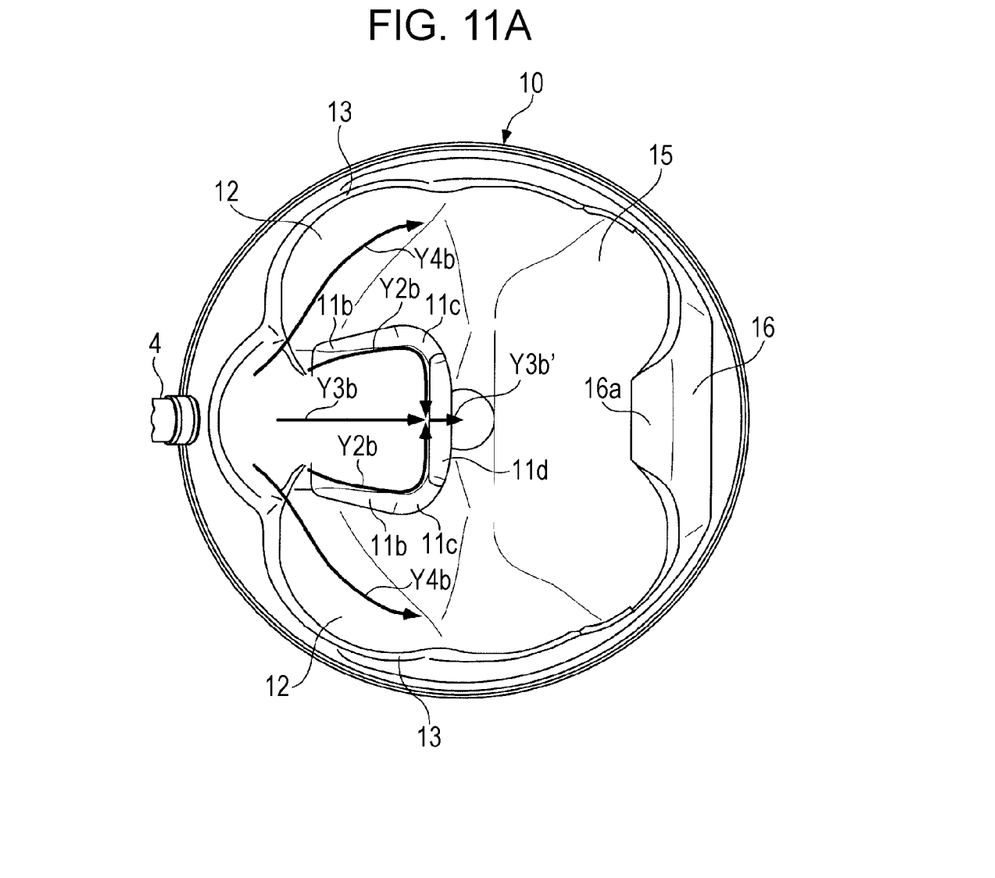
FIGS. 11A and 11B are a plan view and a sectional view, respectively, of the top end of the piston illustrating flows of the fuel mists in the case where the fuel is injected at the second predetermined timing.
Figure 11B:
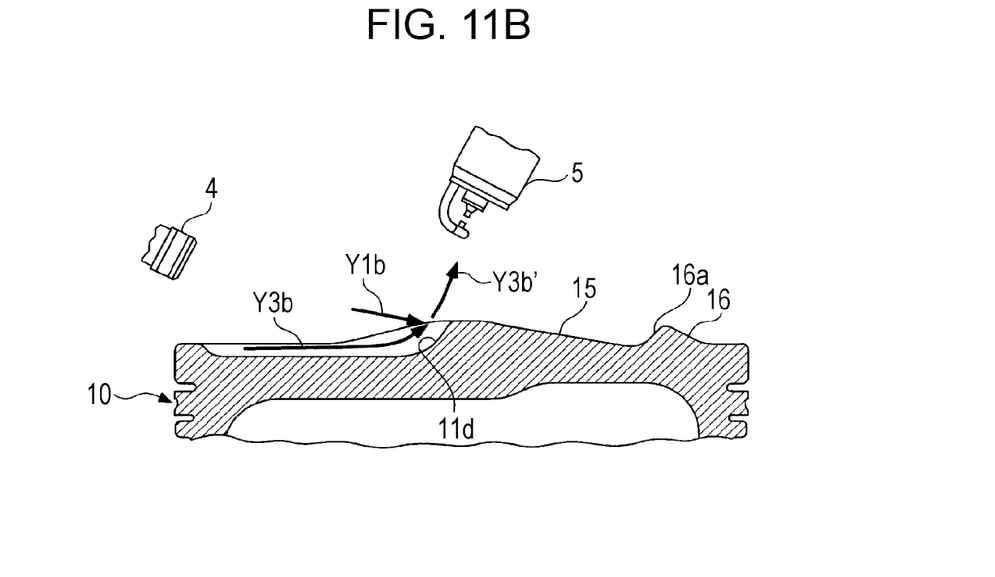

In another case where the fuel is injected from the fuel injection valve 4 in the compression stroke at the second predetermined timing at which the piston 10 reaches the second predetermined position described above, the first to fourth fuel mists F1 to F4 reach (collide with) the top surface of the piston 10 as illustrated in FIGS. 10A and 10B and then flow as illustrated in FIGS. 11A and 11B. In FIG. 10B, the fourth fuel mists F4 are not illustrated for easy understanding.

Specifically, the first fuel mist F1 flowing in the cylinder 3 directly reaches the sloping wall portion 11d as represented by arrow Y1b in FIG. 11B. The second fuel mists F2 reach the bottom surface 11a, flow along the respective sidewall portions 11b, are gathered toward the center of the piston by the curved wall portions 11c while being decelerated, and collide with each other and with the first fuel mist F1 near the center of the sloping wall portion 11d as represented by arrows Y2b in FIG. 11A. Thus, the first fuel mist F1 and the second fuel mists F2 are combined together.

The third fuel mist F3 reaches the bottom surface 11a of the cavity 11 and flows along the bottom surface 11a toward the sloping wall portion 11d as represented by arrow Y3b in FIGS. 11A and 11B. Subsequently, the third fuel mist F3 collides with and is combined with the combination of the first fuel mist F1 and the second fuel mists F2 near the center of the sloping wall portion 11d. In this process, the third fuel mist F3 penetrates in such a manner as to push up the combination of the first fuel mist F1 and the second fuel mists F2. Thus, the combination of the first to third fuel mists F1 to F3 flows along the sloping wall portion 11d toward the spark plug 5 and reaches a position near the electrodes 5a and 5b of the spark plug 5 as represented by arrow Y3b' in FIGS. 11A and 11B.

In this case, as described above, while the third fuel mist F3 flows along the three sloping surfaces S1 to S3, the penetration of the third fuel mist F3 is attenuated stepwise. Consequently, the generation of liquid droplets and hence the generation of deposits on the three sloping surfaces S1 to S3 from the third fuel mist F3 are suppressed. Moreover, the angle of the sloping wall portion 11d is substantially equal to the angle of the spark plug 5. Therefore, the first to third fuel mists F1 to F3 are efficiently sent to a position near the electrodes 5a and 5b.

In FIG. 11B, for easy understanding, arrow Y3b representing the flow of the third fuel mist F3 is illustrated nearer to the bottom surface 11a than the actual center of the flow of the third fuel mist F3, and arrow Y3b' representing the flow of the combination of the first to third fuel mists F1 to F3 is also illustrated nearer to the sloping wall portion 11d than the actual center of the flow of the combination of the first to third fuel mists F1 to F3.

The fourth fuel mists F4 reach the bottom surface 11a of the cavity 11 and are guided upward along the respective guiding slopes 12 and the respective peripheral walls 13 as represented by arrows Y4b in FIG. 11A. Therefore, an air-fuel mixture having an air-fuel ratio suitable for stratified combustion is produced by the fourth fuel mists F4 around a high-concentration air-fuel mixture produced by the combination of the first to third fuel mists F1 to F3 gathered around the electrodes 5a and 5b of the spark plug 5, as described above. Thus, a stratified air-fuel mixture is produced in which a high-concentration air-fuel mixture gathered around the electrodes 5a and 5b of the spark plug 5 is surrounded by a relatively low-concentration air-fuel mixture. That is, a stratified air-fuel mixture is produced in the best state for causing stratified combustion.

In another case where the fuel is injected from the fuel injection valve 4 in the compression stroke at a timing at which the piston 10 reaches a position between the first predetermined position and the second predetermined position, that is, at a timing between the first predetermined timing and the second predetermined timing, some of the first fuel mist F1 flows along the sloping surface 15 and is guided upward by the sloping surface 16a of the guiding protrusion 16. The rest of the first fuel mist F1 collides with the sloping wall portion 11d and is combined with the second fuel mists F2 and the third fuel mist F3 at the sloping wall portion 11d. Subsequently, the combination of the first to third fuel mists F1 to F3 flows along the sloping wall portion 11d toward the spark plug 5 by the effect of penetration of the third fuel mist F3. Meanwhile, the fourth fuel mists F4 flow in a state similar to that in the case where the fuel is injected at the second predetermined timing. Thus, in the case where the fuel is injected at a timing between the first predetermined timing and the second predetermined timing also, a stratified air-fuel mixture is produced in the best state for causing stratified combustion.

As described above, in the engine 1 according to the embodiment, a stratified air-fuel mixture is produced in the best state for causing stratified combustion even in the case where the fuel is injected from the fuel injection valve 4 at any timing between the first predetermined timing and the second predetermined timing in the compression stroke in the stratified combustion mode. Accordingly, the flexibility in the timing of fuel injection is increased. Consequently, even if there are any variations in the timing of injection from the fuel injection valve 4 among the six cylinders 3 due to factors such as variations among finished products and aging, all of the efficiency in the production of a stratified air-fuel mixture, the combustion efficiency, and the fuel efficiency are increased, unlike the related-art example.

The engine 1 described above is realized as a combination of the piston 10 and the fuel injection valve 4 that have relatively simple configurations. Specifically, the piston 10 has the cavity 11 defined by the sidewall portions 11b, the curved wall portions 11c, and the sloping wall portion 11d, and the guiding protrusion 16. The fuel injection valve 4 has the first to fourth injection ports H1 to H4.

The three sloping surfaces S1 to S3 along which the third fuel mist F3 is guided are at respective angles that increase stepwise from the intake side toward the exhaust side. Therefore, the penetration of the third fuel mist F3 is attenuated stepwise. Consequently, the generation of liquid droplets and hence the generation of deposits on the sloping surfaces S1 to S3 from the third fuel mist F3 are suppressed. Thus, the efficiency in the production of a stratified air-fuel mixture, the combustion efficiency, and the fuel efficiency are further increased.

While the above embodiment concerns a case where the fuel injection valve 4 is employed as the fuel injection device according to the present application, the fuel injection device according to the present application is not limited thereto and only needs to be capable of injecting fuel into a cylinder at a predetermined timing.

While the above embodiment concerns a case where the internal-combustion engine according to the present application is applied to a vehicle, the internal-combustion engine according to the present application is not limited thereto and is also applicable to any other machines such as vessels and industrial machines.

While the above embodiment concerns a case where the internal-combustion engine according to the present application is a V-six gasoline engine, the internal-combustion engine according to the present application may alternatively be an in-line multi-cylinder gasoline engine, a horizontally opposed multi-cylinder gasoline engine, or the like.

According to an aspect of the embodiment, there is provided an in-cylinder direct-injection internal-combustion engine (1) in which fuel is directly injected into a cylinder (3) and a mixture of the fuel and air taken into the cylinder (3) is ignited with a spark and is burned. The internal-combustion engine (1) includes a piston (10) configured to reciprocate in the cylinder (3), a spark plug (5) facing toward the inside of the cylinder (3) and configured to generate a spark that ignites the mixture in the cylinder (3), and a fuel injection device (fuel injection valve 4) configured to inject the fuel in the form of a fuel mist obliquely toward a top surface of the piston (10). The piston (10) has a guiding wall (16) projecting from a predetermined position of the top surface of the piston (10), and a cavity (11) provided at a position of the top surface of the piston (10) that is nearer to the fuel injection device (fuel injection valve 4) than the guiding wall (16). The guiding wall (16) has a guiding surface (sloping surface 16a) that guides the fuel mist toward the spark plug (5) when the fuel mist is injected from the fuel injection device (fuel injection valve 4) at a first predetermined timing in a compression stroke at which the piston (10) reaches a first predetermined position. The cavity (11) has a guiding wall portion (sidewall portions 11b, curved wall portions 11c, and a sloping wall portion 11d) that guides the fuel mist toward the spark plug (5) when the fuel mist is injected from the fuel injection device (fuel injection valve 4) at a timing in the compression stroke between the first predetermined timing and a second predetermined timing at which the piston (10) reaches a second predetermined position that is nearer to a top dead center than the first predetermined position.

Therefore, in the compression stroke of the embodiment, the fuel mist injected at the first predetermined timing is guided by both the guiding surface of the guiding wall and the guiding wall portion of the cavity. The fuel mist injected at the timing between the first predetermined timing and the second predetermined timing is guided by the guiding surface of the guiding wall and the guiding wall portion of the cavity or by the guiding wall portion of the cavity. The fuel mist injected at the second predetermined timing is guided by the guiding wall portion of the cavity. Thus, the fuel mist injected from the fuel injection device at any timing in the compression stroke from the first predetermined timing to the second predetermined timing is appropriately guided toward the spark plug by the guiding wall and the cavity or by the cavity. Hence, in the production of a stratified air-fuel mixture, the flexibility in the timing of fuel injection is increased. Consequently, even if there are any variations in the timing of injection from the fuel injection device among different cylinders due to factors such as variations among finished products and aging, all of the efficiency in the production of a stratified air-fuel mixture, the combustion efficiency, and the fuel efficiency are increased, unlike the related-art example.

In the internal combustion engine (1) according to the first aspect of the embodiment, the guiding wall portion preferably includes a pair of sidewall portions (11b) extending such that a distance therebetween increases toward the guiding wall (16), a pair of curved wall portions (11c) each extending from an end of a corresponding one of the pair of sidewall portions (11b) that is nearer to the guiding wall (16) while curving toward a center of the piston (10), and a sloping wall portion (11d) continuous with the pair of curved wall portions (11c) and sloping toward the spark plug (5). Furthermore, the fuel injection device (fuel injection valve 4) preferably has a plurality of injection ports (H1 to H4) from which the fuel is injected in the form of a plurality of fuel mists in respectively different directions. Furthermore, the plurality of injection ports (H1 to H4) preferably include a first injection port (H1) configured such that a fuel mist injected therefrom at the first predetermined timing reaches the guiding surface (sloping surface 16a) of the guiding wall (16) and a fuel mist injected therefrom at the second predetermined timing reaches the sloping wall portion (11d) of the guiding wall portion, a pair of second injection ports (H2) configured such that fuel mists injected therefrom at the timing between the first predetermined timing and the second predetermined timing flow along the pair of sidewall portions (11b), respectively, and a third injection port (H3) configured such that a fuel mist injected therefrom at the timing between the first predetermined timing and the second predetermined timing reaches a position of a bottom surface (11a) of the cavity (11) that is nearer to the fuel injection device (fuel injection valve 4) than the sloping wall portion (11d).

Therefore, in a case where the fuel is injected at the first predetermined timing, the fuel mist injected from the first injection port (hereinafter referred to as "first fuel mist") reaches the guiding surface of the guiding wall and is guided toward the spark plug by the guiding surface. Furthermore, the fuel mists injected from the pair of second injection ports (hereinafter referred to as "second fuel mists") flow along the pair of sidewall portions, respectively, and are gathered toward the center of the piston, while being decelerated, by the pair of curved wall portions curving from the sidewall portions toward the center of the piston. Subsequently, the pair of second fuel mists collide with and are combined with each other near the center of the sloping wall portion. Furthermore, the fuel mist injected from the third injection port (hereinafter referred to as "third fuel mist") flows toward a position of the bottom surface of the cavity that is nearer to the fuel injection device than the sloping wall portion. Therefore, the third fuel mist collides with the bottom surface of the cavity, flows slightly above the bottom surface and toward the sloping wall portion, and pushes out the second fuel mists having been combined together near the center of the sloping wall portion over the end of the sloping wall portion that is nearer to the spark plug, whereby the third fuel mist flows toward the spark plug together with the second fuel mists. Consequently, the first to third fuel mists all reach the spark plug.

In another case where the fuel is injected at the second predetermined timing, the first fuel mist directly reaches the sloping wall portion of the guiding wall portion, whereas the pair of second fuel mists flow along the pair of sidewall portions and the pair of curved wall portions and are combined with each other and with the first fuel mist near the center of the sloping wall portion, as described above. Furthermore, the third fuel mist collides with the bottom surface of the cavity, flows slightly above the bottom surface and toward the sloping wall portion, and pushes out the first fuel mist and the second fuel mists over the end of the sloping wall portion that is nearer to the spark plug, whereby the third fuel mist flows toward the spark plug together with the first fuel mist and the second fuel mists. Consequently, the first to third fuel mists all reach the spark plug. In this case, the pair of second fuel mists flow along the pair of sidewall portions, respectively, when injected both at the first predetermined timing and at the second predetermined timing. Thus, the probability that the second fuel mists may go over the sidewall portions and be diffused is reduced. Furthermore, the second fuel mists are gathered toward the center of the piston by the pair of curved wall portions while being decelerated. Therefore, the probability that the second fuel mists may go over the pair of curved wall portions and be diffused is also reduced. Thus, the second fuel mists are efficiently gathered near the center of the sloping wall portion and are efficiently sent to the spark plug.

As described above, the fuel mists injected from the fuel injection device at any timing from the first predetermined timing to the second predetermined timing are appropriately and efficiently guided toward the spark plug by the guiding wall and the cavity or by the cavity while the diffusion of the fuel mists is suppressed. Thus, the efficiency in the production of a stratified air-fuel mixture, the combustion efficiency, and the fuel efficiency are further increased. Moreover, such an internal-combustion engine is realized as a combination of the piston and the fuel injection device that have relatively simple configurations. Specifically, the piston has the cavity defined by the pair of sidewall portions, the pair of curved wall portions, and the sloping wall portion, and the guiding wall. The fuel injection device has the first to third injection ports.

In the above internal-combustion engine (1) of the embodiment, the plurality of injection ports (H) preferably further include a pair of fourth injection ports (H4) from which the fuel is injected in the form of fuel mists toward outer sides with respect to the injections from the pair of second injection ports (H2), respectively. Furthermore, the top surface of the piston preferably includes a pair of guiding slopes (12) provided on outer sides of the pair of sidewall portions (11b), respectively, of the cavity (11) and sloping toward a combustion chamber provided in the piston (10). Furthermore, the fuel mists injected from the pair of fourth injection ports (H4) at the timing between the first predetermined timing and the second predetermined timing preferably flow along the pair of guiding slopes (12), respectively.

In such an internal-combustion engine of the embodiment, the fuel mists injected from the fourth injection ports (hereinafter referred to as "fourth fuel mists") at the timing between the first predetermined timing and the second predetermined timing flow along the pair of guiding slopes, respectively, sloping toward the combustion chamber and are thus guided toward the combustion chamber. Therefore, an air-fuel mixture produced in the cylinder by the first to third fuel mists comes to have an air-fuel ratio suitably adjusted for combustion by the fourth fuel mists. Consequently, the combustion efficiency and the fuel efficiency are further increased.

In the above internal-combustion engine (1) of the embodiment, the bottom surface (11a) and the sloping wall portion (11d) of the cavity (11) in combination preferably form a plurality of sloping surfaces (first to third sloping surfaces S1 to S3) that are continuous with one another. Furthermore, the plurality of sloping surfaces (S1 to S3) are preferably at respective angles that increase stepwise toward a direction away from the fuel injection device (fuel injection valve 4).

Therefore, while the third fuel mist flows along the plurality of sloping surfaces, the penetration of the third fuel mist is attenuated stepwise. Thus, the generation of liquid droplets and hence the generation of deposits on the plurality of sloping surfaces from the third fuel mist are suppressed. Consequently, the efficiency in the production of a stratified air-fuel mixture, the combustion efficiency, and the fuel efficiency are further increased.

Obviously, numerous modifications and variations of the present invention are possible in light of the above teachings. It is therefore to be understood that within the scope of the appended claims, the invention may be practiced otherwise than as specifically described herein.

What is claimed is:

1. An internal-combustion engine comprising:
a cylinder;
a piston provided in the cylinder to reciprocate in the cylinder and including a top surface, a guiding protrusion, and a cavity, the guiding protrusion projecting from a predetermined position of the top surface so as to be separate and distinct from the cavity, the cavity being provided in the top surface;
a spark plug provided to face toward an inside of the cylinder and to generate a spark that ignites a mixture of fuel and air in the cylinder; and
a fuel injection device to obliquely inject the fuel in a form of a fuel mist toward the top surface of the piston, the cavity being provided at a position closer to the fuel injection device than the guiding protrusion when viewed from above the top surface of the piston, the guiding protrusion including a guiding surface to guide the fuel mist toward the spark plug when the fuel mist is injected from the fuel injection device at a first predetermined timing in a compression stroke, the piston being provided to reach a first predetermined position at the first predetermined timing, the cavity including a guiding wall portion to guide the fuel mist toward the spark plug when the fuel mist is injected from the fuel injection device at a timing in the compression stroke between the first predetermined timing and a second predetermined timing, the piston being provided to reach a second predetermined position closer to a top dead center than the first predetermined position at the second predetermined timing.

2. The internal-combustion engine according to claim 1, wherein the guiding wall portion includes
first and second sidewall portions extending such that a distance between the first and second sidewall portions increases as being closer to the guiding protrusion,
first and second curved wall portions extending from ends of the first and second sidewall portions that are closer to the guiding protrusion while curving toward a center of the top surface, and
a sloping wall portion connected with the first and second curved wall portions and sloping toward the spark plug,
wherein the fuel injection device has a plurality of injection ports from which the fuel is injected in a form of a plurality of fuel mists in respectively different directions,
wherein the cavity includes a bottom surface provided at a position closer to the fuel injection device than the sloping wall portion, and
wherein the plurality of injection ports include
a first injection port provided such that a first fuel mist injected from the first injection port at the first predetermined timing is directed to substantially reach the guiding surface of the guiding protrusion, and such that the first fuel mist injected from the first injection port at the second predetermined timing is directed to substantially reach the sloping wall portion of the guiding wall portion,
a pair of second injection ports provided such that second fuel mists injected from the second injection ports at the timing between the first predetermined timing and the second predetermined timing respectively are directed to substantially flow along the first and second sidewall portions, and
a third injection port provided such that a third fuel mist injected from the third injection port at the timing between the first predetermined timing and the second predetermined timing is directed to substantially reach the bottom surface of the cavity.

3. The internal-combustion engine according to claim 2, wherein the plurality of injection ports further include a pair of fourth injection ports from which the fuel is injected in a form of fourth fuel mists toward respective outer sides with respect to the second fuel mists injected from the pair of second injection ports, wherein the top surface of the piston includes first and second guiding slopes respectively provided on outer sides of the first and second sidewall portions, the first and second guiding slopes sloping toward a combustion chamber provided in the cylinder, and wherein the fourth fuel mists injected from the pair of fourth injection ports at the timing between the first predetermined timing and the second predetermined timing respectively are directed to substantially flow along the first and second guiding slopes.

4. The internal-combustion engine according to claim 2, wherein the bottom surface and the sloping wall portion of the cavity in combination provides a plurality of sloping surfaces that are continuous with one another, and wherein the plurality of sloping surfaces are at respective angles that increase stepwise as being farther from the fuel injection device.

5. The internal-combustion engine according to claim 1, wherein the top surface of the piston includes a sloping guide surface sloping downward from the guiding wall portion of the cavity to the guiding protrusion.

6. The internal-combustion engine according to claim 5, wherein the sloping guide surface is connected with the guiding surface of the guiding protrusion.

7. The internal-combustion engine according to claim 1, wherein the guiding protrusion is disposed at a position closer to an exhaust side of the cylinder than the guiding wall portion of the cavity.

8. The internal-combustion engine according to claim 1, wherein the guiding surface of the guiding protrusion guides the fuel mist from an exhaust side toward an intake side of the cylinder when the fuel mist is injected from the fuel injection device at a first predetermined timing in a compression stroke.

9. The internal-combustion engine according to claim 8, wherein the guiding surface of the guiding protrusion guides the fuel mist in an upward direction above the top surface of the piston when the fuel mist is injected from the fuel injection device at a first predetermined timing in a compression stroke.

* * * * *